H. GETCHELL.
AUTOMOBILE SIGNAL.
APPLICATION FILED FEB. 15, 1921.

1,435,116.

Patented Nov. 7, 1922.

Harry Getchell.
INVENTOR

BY *Victor J. Evans.*
ATTORNEY

WITNESSES:

Patented Nov. 7, 1922.

1,435,116

UNITED STATES PATENT OFFICE.

HARRY GETCHELL, OF DETROIT, MICHIGAN.

AUTOMOBILE SIGNAL.

Application filed February 15, 1921. Serial No. 445,168.

*To all whom it may concern:*

Be it known that I, HARRY GETCHELL, a citizen of the United States of America, residing at Detroit, in the county of Wayne and State of Michigan, have invented new and useful Improvements in Automobile Signals, of which the following is a specification.

This invention comprehends the provision of an automobile signal designed to indicate to the drivers of other vehicles, the fact that the car carrying the signal is about to slow down and possibly stop. The signal is particularly adapted for use in congested districts.

To this end, the invention makes use of a number of lights varying in color, and each having a particular significance with regard to the speed of the machine, the lights being controlled by the speed of the car.

The nature and advantages of the invention will be better understood when the following detail description is taken in connection with the accompanying drawing, the invention residing in the combination and arrangement of parts as claimed.

In the drawing forming part of this application, like numerals of reference indicate similar parts in the several views and wherein.

Figure 4:
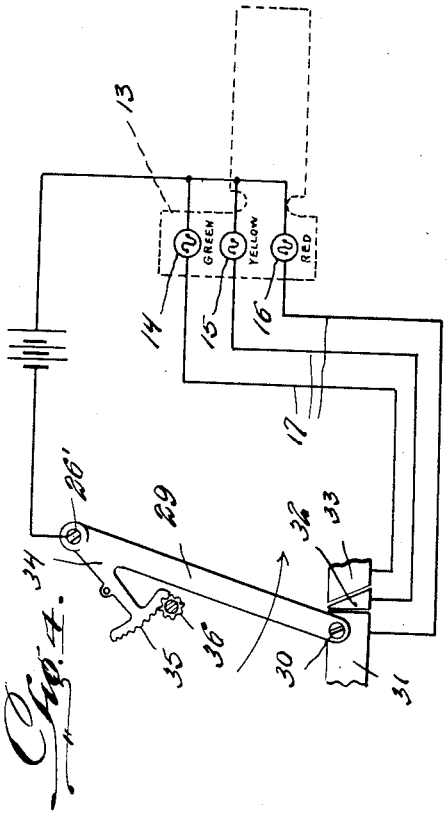
Figure 4 is a diagrammatic view.
Figure 1:
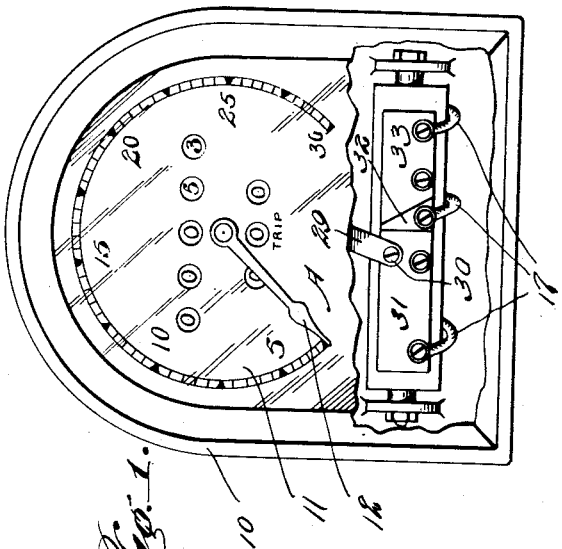
Figure 1 is a front view of the device partly in section.

Referring to the drawing in detail, A indicates generally a speedometer of any well-known construction, wherein 10 receives a casing, 11 the graduated dial and 12 the pointer or movable indicating element which is actuated incident to the speed of the vehicle. This casing or speedometer is adapted to be mounted on the vehicle (not shown) at an appropriate point, while a casing 13 supporting a number of electric lights 14, 15 and 16 respectively, is adapted to be mounted at the rear of the vehicle, these lights being connected in circuits by means of the wires 17 as illustrated in Figure 4. The electric lights are preferably arranged in super-imposed relation, the uppermost light 14 being of a green color, and the next light in order indicated at 15, is yellow, while the lowermost light indicated at 16 is red. These lights are illuminated singly in accordance with the speed of the vehicle, the red light being used when the vehicle with which it is equipped is about to stop, so as to convey to the drivers of other vehicles this fact in order that they will not stop their machines too close to the vehicle carrying the signal. The light 15 is illuminated only when the car is travelling at a moderate rate of speed, while the green light is illuminated when the car is travelling at an excessive rate of speed. The lights are controlled in a manner to be hereinafter described. Now, should the car be travelling at an excessive rate of speed the green light would be illuminated, and should for any reason the operator of the car find it necessary to reduce the speed of the vehicle, the green light is automatically extinguished and the yellow light illuminated simultaneously with the reduction of the speed, thereby warning the drivers of machines in the rear to cut down on the speed of their machines with a view of avoiding accidents. In congested districts, where it is sometimes necessary to check the speed of the vehicle to approximately four miles or less, and sometimes bring the vehicle to a stop, the red light 16 will be automatically illuminated and the yellow light extinguished, so as to warn the drivers of other machines to correspondingly check the speed of their vehicles.

Figure 2:
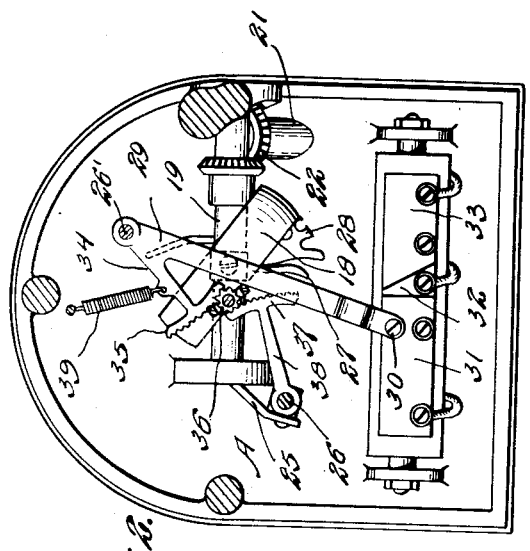
Figure 2 is a similar view with the front of the casing removed.

For the purpose of controlling the lights hereinabove referred to, I make use of a governor 18 which is mounted upon the shaft 19 and normally held at an inclination thereto and in the position illustrated in Figure 3 by means of a suitable spring 20. The shaft 19 is rotated by means of the shaft 21 forming part of the speedometer, this shaft being suitably geared to the shaft 19 as at 22. The shaft 19 is provided with a longitudinal bore 23 opening at one end of the shaft and slidably receiving a rod 24, this rod being terminally connected to a bracket 25 which is connected to a shaft 26 arranged at right-angles to the rod 24. Carried by the opposite extremity of the rod 24 is an arm 27 which is adapted to be engaged by the cam-like surface 28 of the governor when the latter tends to assume a position at right-angles to the shaft 19 incident to centrifugal force, this movement of the governor being indicated by the arrow in Figure 3. Secured to one end of the shaft 26' and arranged at a right-angle thereto is an arm 29 which moves with the shaft 26 and supports at its free end a movable contact 30, the latter moving across a plurality of fixed contacts 31, 32 and 33 respectively, which are connected with the conducting wires 17. The arm 29 is formed with a branch 34 carrying a toothed segment 35 which meshes with a pinion 36, while meshing with the opposite side of this pinion is a toothed segment 37 carried by the arm 38 which is fixed upon the shaft 26 for movement therewith. The movable parts of the mechanism are normally maintained in a position illustrated in Figure 2 by means of a spring 39 which has one end secured to the casing and the opposite end secured to the branch 34 of the arm 29.

Figure 3:
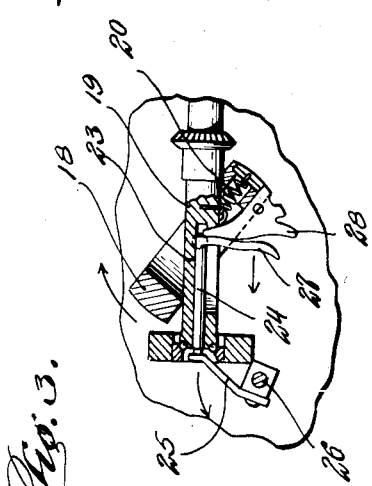
Figure 3 is an enlarged detail section view through the governor and its associated parts.

In practice, the shaft 19 is rotated incident to the travel of the vehicle, and during the rotation of the shaft the governor 18 under the influence of centrifugal force, moves upon its pivot in a direction indicated by the arrow in Figure 3. When the governor 18 is moved a predetermined distance in a direction of the arrow indicated at Figure 3, or in other words, when the vehicle is travelling at a comparatively low speed, the cam-like surface 28 of the governor contacts the arm 27 and moves the rod 24 outwardly a slight distance to partially rotate the shaft 26, thereby imparting movement to the arm 29 through the segments and pinion above referred to, the movement of the arm 29 being such as to bring the movable contact 30 into engagement with the fixed contact 31, which is the contact which the arm 29 approaches, thereby illuminating the red light 16 for the purpose above mentioned. As the vehicle increases its speed, to what may be termed a normal speed, the governor 18 assumes a position incident to centrifugal force, to operate the mechanism in a manner to move the arm 29 a greater distance, thereby bringing the movable contact 30 into engagement with the fixed contact 32, during which operation the red light is extinguished and the yellow light illuminated, being connected in circuit with the contact 32 as will be understood. When the machine is travelling at an excessive rate of speed, the mechanism functions in the same manner above described, to move the arm 29 its maximum distance, thereby bringing the movable contact into engagement with the fixed contact 33 illuminating the green light 14 and at the same time extinguishing the yellow light 15. As the speed of the machine is reduced, the arm 29 is moved gradually from the position just referred to its normal position through the instrumentality of the spring 39, and during the return movement of the arm 29 the movable contact 30 successively engages the fixed contacts in order, thereby extinguishing the light connected in circuit with the fixed contact from which the movable contact is separated, and illuminating the next light in order which is connected in circuit with the fixed contact with which the movable contact is brought into engagement.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:

1. A vehicle signal of the character described comprising a plurality of lamps of relatively different colors, a shaft mounted for rotation and driven from said vehicle, a governor including a wheel pivoted on said shaft, and normally disposed at an inclination thereto, yieldable means for normally holding the governor in normal position, and means connected in circuit with said lamp and actuated by said governor for illuminating said lamps singly at different speeds of the vehicle.

2. A vehicle signal of the character described comprising a plurality of lamps of relatively different colors, a casing, a shaft mounted longitudinally therein for rotation and driven from said vehicle, said shaft having a longitudinal bore opening at one end thereof, a rod arranged for reciprocation within said bore, an arm secured to said rod and depending from one end thereof, a bracket in contacting engagement with the opposite end of said rod and secured to a second shaft transversely arranged within the casing, a T-shaped arm having toothed segments thereon and normally horizontally disposed within the casing, a normally vertically disposed arm having substantially an angled portion formed with a laterally arranged toothed end thereon and spring means for holding the last mentioned arm in one position, a pinion adapted to mesh with the toothed segments of the T-shaped arm and the toothed end of the angled portion, a governor including a wheel pivoted on the first mentioned shaft and normally disposed at an inclination thereto, yieldable means for holding the governor in normal position, cam means secured to the governor and engaging the first mentioned arm and means connected to the vertically disposed arm in circuit with said lamps and actuated with said governor for illuminating said lamps singly at different speeds of the vehicle.

In testimony whereof I affix my signature.

HARRY GETCHELL.